United States Patent Office 2,920,255
Patented Jan. 5, 1960

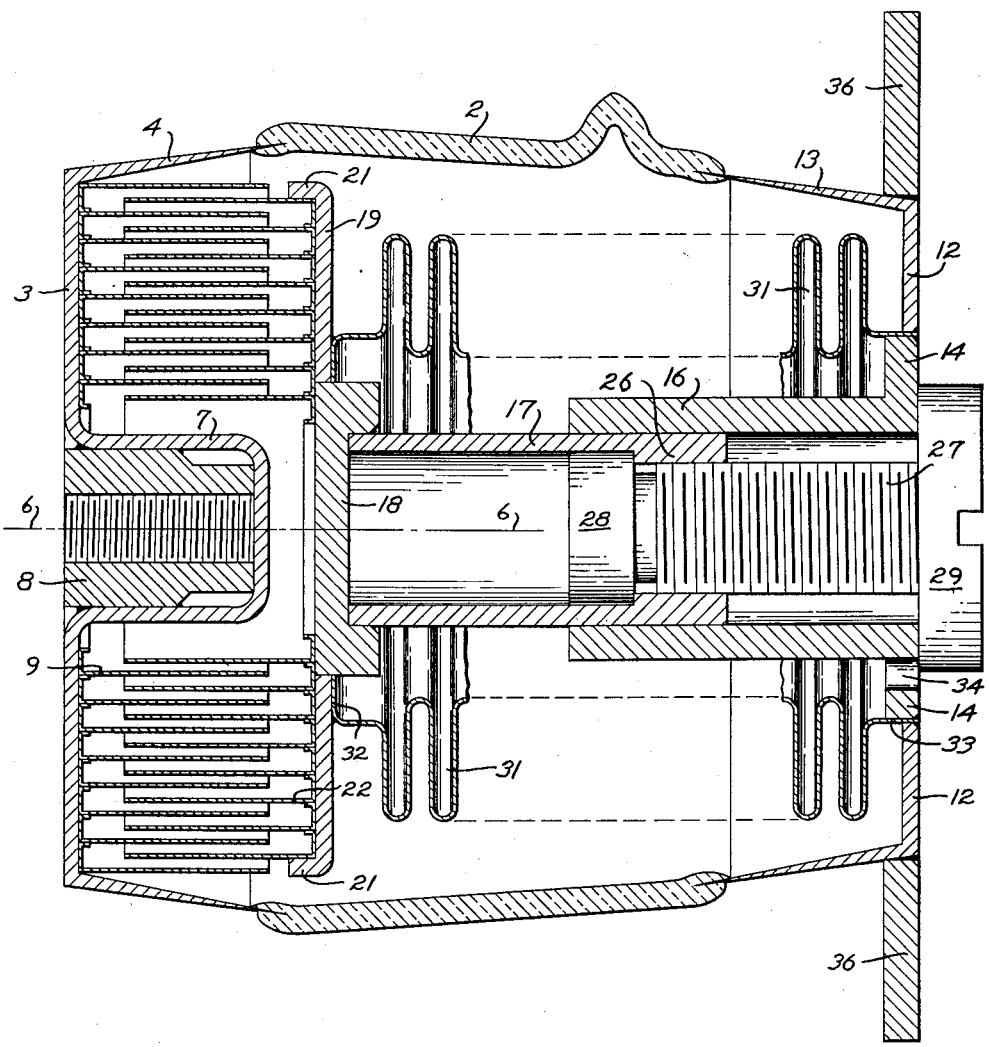
INVENTOR
HAROLD A. LUFT
BY Charles S. Evans
his ATTORNEY

2,920,255

VACUUM VARIABLE CAPACITOR

Harold A. Luft, Campbell, Calif., assignor to Jennings Radio Manufacturing Corporation, San Jose, Calif., a corporation of California Application March 12, 1956, Serial No. 570,951

8 Claims. (Cl. 317—245)

My invention relates to vacuum variable capacitors.

One of the objects of my invention is the provision of a vacuum variable capacitor of exceedingly small size which possesses the capacity range of much larger implements.

Another object is the provision of a vacuum variable capacitor suitable for high frequency application in electronic equipment, where small size and weight without loss of efficiency are imperative.

Still another object is the provision of a vacuum variable capacitor possessing low inductance, and low impedance to ground with high thermal conductivity and emissivity.

Another object of the invention is the provision of a small variable capacitor where an adjusted capacity can be maintained exactly over long periods; and where there is a better than average capacity-to-temperature stability.

Still another object is the provision of a vacuum variable capacitor in which the mounting of the fixed condenser plates insures rapid dissipation of heat generated in the plates, absence of vibration and low inductance.

Another object of the invention is the provision of a miniature implement of high precision and dependability but of relatively lower production costs.

My invention possesses other objects, some of which will be brought out in the following description of the invention. I do not limit myself to the showing made by the said description and the drawings, since I may adopt variant forms of the invention within the scope of the appended claims.

Referring to the drawings: The figure is a half sectional view taken through the longitudinal axis of the capacitor. For clarity, the figure is drawn four times the actual size of a capacitor having a capacity of 100 micromicrofarads.

Broadly considered, the vacuum variable capacitor of my invention is characterized by exceedingly small size and extremely close spacing between capacitive surfaces of concentric cylindrical plates. The close spacing provides the desired range of capacitance, while the small size is achieved by characteristic arrangement and proportion of parts compactly disposed within a vacuumized envelope, comprised of a central glass bulb closed on opposite ends with copper end caps. In one end of the capacitor, fixed cylindrical plates and a high voltage terminal are confined within the copper end cap. The desired range of capacity is achieved by a set of mobile interleaving cylindrical plates supported on a flanged crown block carried on the inner end of a short hollow shaft. The shaft is axially slidable in a bearing tube between stops which limit its maximum excursion.

The outer end of the bearing tube is fixed flush with the outer face of the end cap. A short metallic bellows surrounding the bearing tube is interposed between the end cap and the crown block to seal the envelope hermetically while leaving the hollow shaft exposed through the open end of the bearing tube. Screw means are provided between the bearing tube and the shaft to effect adjustment of the mobile plates; and by frictional resistance to turning maintain the plates in adjusted position. This resistance is increased to an effective degree by atmospheric pressure on the interior of the bellows, which tends to move the mobile plates into maximum interleavment.

My miniature vacuum variable capacitor is designed for use in a capacity range between 0.5 and 500 micromicrofarads. Voltage before breakdown by arc-over, is approximately 5 to 10 kv. The implement shown in the drawing has a range of 25 to 100 micromicrofarads and is 1⅞" long by 1⅝" diameter of envelope.

Because of its small size, my capacitor is particularly useful in compact, high-frequency transmitters, where small size, stability and ease of adjustment are important. Also, because of its low inductance and size, a high "Q" or quality factor is inherent, permitting maximum sharpness or selectivity in a desired operating frequency.

My capacitor comprises a generally cylindrical glass or other dielectric bulb 2, closed at one end by a copper end cap, comprising a flat end plate 3 integrally formed with a conical flange 4, having a feathered edge hermetically sealed in the edge of the bulb. Bulb and end cap are disposed concentrically about a central axis 6 along which and about which all the parts of my capacitor are arranged.

At the fixed end of the capacitor (left of figure) the end plate 3 is integrally formed with an outwardly opening concentric cylindrical cup 7, flush with the end plate at its open end, and extending inwardly an amount substantially the same as the width of the surrounding flange 4. The entire end cap, including plate, peripheral flange and central cup, is formed from a single piece of copper so that leaks and other defects or disadvantages incident to the handling and fabrication of separate small pieces for this important part are avoided.

An internally threaded copper stud 8 fills the cup and is brazed therein. This provides a rigidly secure mount and an excellent thermal connection, and also the high voltage terminal for my capacitor. If desired it may be silver plated to improve high frequency conductivity.

Closely spaced within the end cap are the concentric cylindrical condenser plates 9, substantially filling the annular recess within the end cap. These plates are preferably made with radial flanges at one end and are brazed or otherwise integrally united directly to the inner face of the flat end plate 3. This gives a very rigid mounting for the plates with low inductance and excellent thermal conductivity. The free ends of the plates lie in a plane substantially coincident with the inner face of the cup bottom and the peripheral edge of the conical flange 4.

At the opposite end of the capacitor is the other end cap comprising the flat annular end plate 12 with the peripheral conical flange 13 sealed into the glass bulb along the edge opposite the flange 4 first described. The copper flanges thus facing each other are separated by a relatively short glass bulb, and I have found that this arrangement gives the maximum temperature-to-capacity stability. The length of the glass bulb is just adequate to withstand the voltage applied during the exhaust operation; and this is only slightly more than twice the operating peak voltage used in final testing.

Integrally united to the annular end plate 12 at its inside peripheral edge and flush therewith is the radial flange 14, formed on the bearing tube 16, which extends concentrically into the envelope to provide a rigidly stable slide bearing for the hollow shaft 17.

The inner end of the hollow shaft is closed by the crown block 18, having the radially extending flange 19 which together with the block provides a flat surface perpendicular to the axis 6. Upon this surface and within the short peripheral flange 21, the mobile condenser plate 22 are brazed. These plates also are concentric and spaced to interleave the fixed plates 9.

Because of a high degree of accuracy in formation and assembly of the parts, and of rigidity in mounting the concentric plates, it is possible to space them a very few thousandths of an inch apart, so that a very material increase in capacity is secured without increase in physical size, and therefore without those losses and adverse phenomena evalued by size.

The outer end of the shaft 17 is formed with an internal flange 26, threaded to mesh with adjusting screw 27. The inner end of the screw is provided with a piston-like head 28 which, seating against the flange shoulder, acts as a stop, marking the maximum extension of the shaft on the screw and the maximum capacity of the implement.

The outer end of the screw is formed with a very thin head 29, slotted for screw driver adjustment, and bearing against the outer face of the bearing tube flange 14. Turning the screw to the right, draws the hollow shaft into the bearing tube until the inner end of the tube is engaged by the approaching edge of the crown block which marks the withdrawal limit of the mobile plates or minimum capacity stop.

In order to preserve the vacuum within the envelope and also provide an ample continuous conductor connecting the end cap 12—13 to the mobile condenser plates 22, a copper or bronze bellows 31 surrounding the bearing tube, is integrally interposed between the plates and the end cap. This is effectively accomplished by brazing the inner end flange 32 of the bellows into the corner between the crown block and its flange; and brazing the outer end flange 33 into the joint between the end plate 12 and bearing tube flange 14. While atmospheric air would of course leak through the bearing between the bearing tube and hollow shaft despite a close fit, it is preferred to provide a vent 34 in the flange 14, so that atmospheric pressure is maintained within the bellows to insure an unremitting pressure against the crown block structure, tending to move the mobile plates toward their position of maximum capacity.

This inward pressure is carried by the head 29 bearing against the flat face of the bearing tube flange, and therefore provides a considerable frictional resistance to turning, sufficient to prevent idle manual tampering with adjustment but permitting a desired change with a screw-driver. The bearing of this head against the bearing tube also contributes in material degree to the maintenance of the desired rigid stability of the mobile plate assembly and its supporting structure.

Extending radially outwardly from the end cap 12—13 and flush with the plate 12 is a copper flange 36, by which the implement may be secured to a shield or insulating structure. It also provides a very low impedance to ground, and gives important help in dissipating heat.

I claim:

1. In a vacuum variable capacitor, an evacuated envelope concentrically arranged about a longitudinal axis and having a conically flanged metallic end cap hermetically sealing each opposite end thereof, the first said end cap having a concentric integral outwardly opening cup extending into the envelope and constituting an external terminal electrode of the capacitor, and a plurality of fixed cylindrical condenser plates each having a radially extending flange at one end, said radial flanges concentrically arranged in planar alignment between the cup and said end cap flange and integrally united to said first end cap within the envelope.

2. The combination according to claim 1, in which an internally threaded plug is integrally united to the first end cap within said cup.

3. A vacuum variable capacitor in accordance with claim 1 in which a set of mobile condenser plates is mounted on the second end cap for movement toward and away from the fixed condenser plates, and an expansible metallic bellows is integrally interposed hermetically between the mobile condenser plates and second end cap.

4. In a vacuum variable capacitor, an evacuated envelope concentrically arranged about a longitudinal axis and comprising a substantially cylindrical glass bulb, a circular flat metallic end plate having a conical peripheral flange hermetically sealed to each of the two opposite ends of the bulb, a bearing tube extending concentrically into the envelope and integrally mounted on one of the flanged end plates, a hollow shaft slidably disposed in the bearing tube, screw means engaging the outer end of the hollow shaft for moving the shaft in the bearing, a crown block heremetically sealing the inner end of the hollow shaft and having a radially extending integral flange, a metallic bellows surrounding the bearing tube and integral at its inner end with the flanged crown block and at its outer end with the adjacent end plate, a series of concentric cylindrical condenser plates integrally fixed on the crown block flange, and a second series of concentric cylindrical condenser plates integrally fixed on the other end plate.

5. A vacuum capacitor in accordance with claim 4 in which the end plate mounting the bearing tube is provided with a radially extending integral flange constituting a high voltage terminal, and the opposite end plate is provided with an internally threaded integral plug extending concentrically into the envelope substantially coextensive with the second series of condenser plates and constituting a second high voltage terminal.

6. A vacuum variable capacitor in accordance with claim 4 in which the screw means is a shaft at its inner end threaded into the hollow shaft and at its outer end having a head bearing against the bearing tube.

7. A vacuum variable capacitor in accordance with claim 4 in which the screw means and the hollow shaft are provided with mutually engaging stops to limit their separating movement.

8. In a vacuum variable capacitor, an evacuated envelope concentrically arranged about a longitudinal axis and comprising a substantially cylindrical glass bulb, a circular flat metallic end plate having a conical peripheral flange heremetically sealed to each of the two opposite ends of the bulb, a bearing tube extending concentrically into the envelope and having a radial flange on its outer end integral and flush with one of the flat end plates, a hollow shaft slidable in the bearing tube and having on its outer end an internally threaded internal flange, a crown block integrally mounted on the inner end of the bearing tube and having a radially extending flange forming with the crown block a flat flush face, a series of concentric cylindrical condenser plates integrally fixed on the flat flush face, a second series of concentric cylindrical condenser plates integrally fixed on the adjacent end plate, a metallic bellows surrounding the bearing tube and integral at its inner end with the crown block and at its outer end with the adjacent end plate, and a screw spindle threaded into the internal flange of the bearing tube and having on its inner end a head mobile within the tube and stopped against the threaded flange and on its outer end having a flange engaging the outer end of the bearing tube.

References Cited in the file of this patent

UNITED STATES PATENTS

| | | |
|---|---|---|
| 2,170,695 | Pike | Aug. 22, 1939 |
| 2,511,338 | Jennings | June 13, 1950 |
| 2,533,713 | Chamberlin | Dec. 12, 1950 |
| 2,556,846 | Longacre | June 12, 1951 |
| 2,740,077 | Clarke | Mar. 27, 1956 |

FOREIGN PATENTS

| | | |
|---|---|---|
| 851,088 | France | Sept. 25, 1939 |
| 638,857 | Great Britain | June 14, 1950 |
| 889,654 | Germany | Sept. 14, 1953 |